United States Patent Office 3,502,711
Patented Mar. 24, 1970

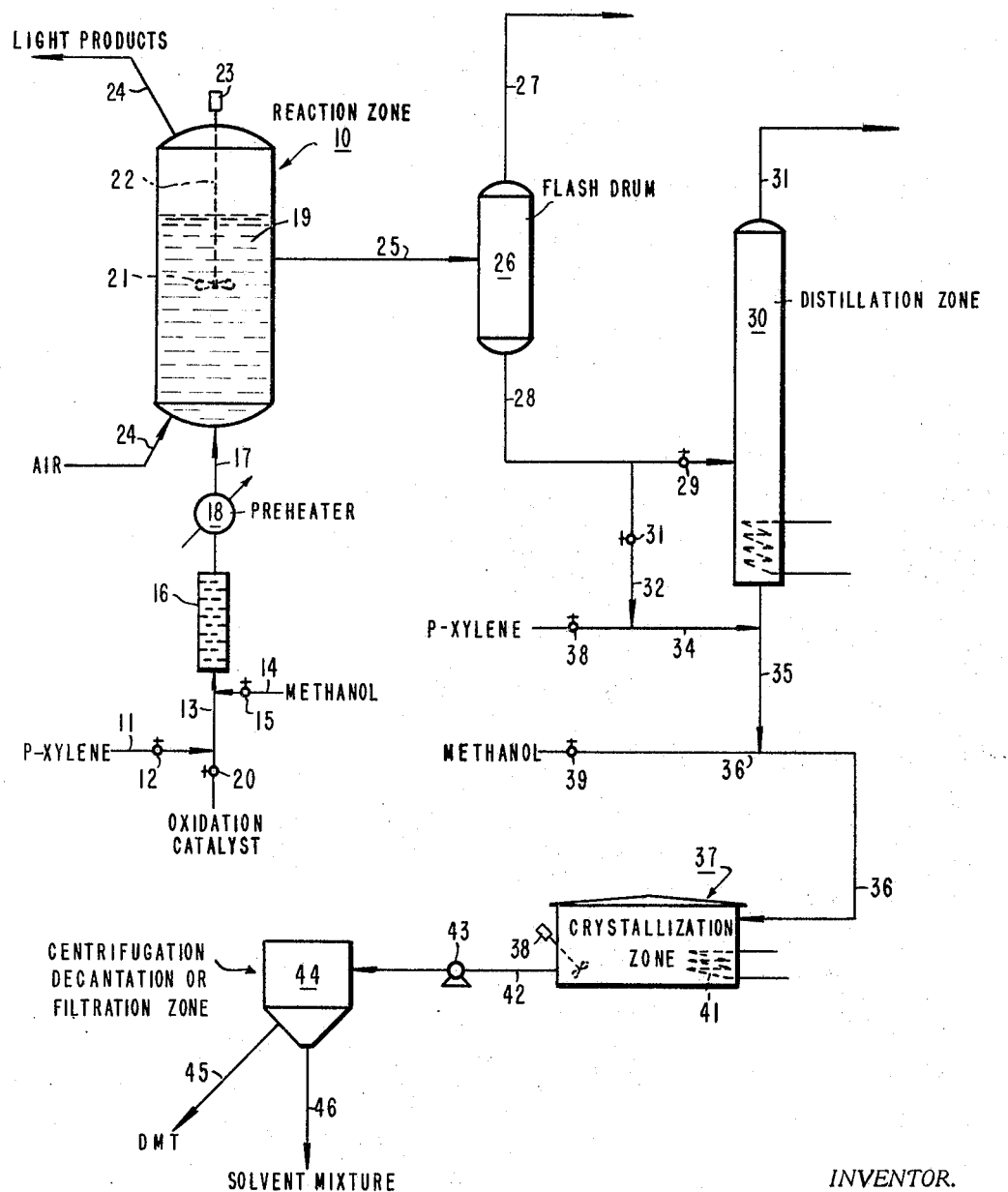

3,502,711
PURIFICATION OF DIMETHYLTEREPHTHALATE
Billy E. Claybaugh, Baton Rouge, La., and Lloyd E. Compton and James K. Nickerson, Baytown, and Albert J. Shmidl, Crosby, Tex., assignors to Esso Research and Engineering Company
Filed Oct. 17, 1966, Ser. No. 587,028
Int. Cl. C07c 67/06, 69/82
U.S. Cl. 260—475
9 Claims

ABSTRACT OF THE DISCLOSURE

Crude dimethylterepthalate is purified by crystallization from a solution in a specific admixture of methanol and paraxylene.

---

The present invention is directed to purification of dicarboxylic acid esters. More particularly, the invention is concerned with the purification of dimethylterepthalate. In its more specific aspects, the invention is concerned with the purification of dimethylterephthalate by crystallization.

The present invention may be briefly described as a method for purifying dimethylterephthalate in which impure dimethylterephthalate containing traces of acids and colorforming materials is dissolved in paraxylene to form a solution. Purified dimethylterephthalate is recovered from the solution by crystallization. The present invention involves maintaining in the xylene solution of dimethylterephthalate during purification an amount of methanol within the range from about 2% to about 50% by weight based on the paraxylene. Thereafter, dimethylterephthalate is crystallized from the methanol-xylene solution by reducing the temperature of the solution and thereafter the crystallized dimethyl terephthalate is recovered from the solution.

While the amount of methanol in the xylene solution may be maintained from about 2% to about 50%, it is preferred to maintain about 20% to about 33% by wt. of methanol in paraxylene.

The dimethylterephthalate may be recovered from the solution containing the crystallized dimethylterephthalate by filtration, decantation, centrifugation, or by a combination of one or more of filtration, decantation or centrifugation.

The amount of methanol may be maintained in the solution by distillation wherein at least a portion of at least one of the solvents may be removed where the methanol and xylene are not in the proper ratio. The amount of methanol and xylene may be maintained also by adding to the solution a sufficient amount of at least one of the solvents which is either paraxylene or methanol.

In the practice of the present invention, a solvent is ordinarily employed in purifying dimethylterephthalate by removing traces of acids and colorforming materials which are impurities. These impurities may comprise the following compounds: methyl benzoate, tolualdehyde, methyl toluate, toluic acid, monomethylterephthalate, terephthalic acd, and the like. In the one-step oxidation-esterification of paraxylene, methanol is present during the oxidation stage. Thus, paraxylene and methanol may be present in the product. It is therefore quite useful that these solvents are suitable for the purification of the dimethylterephthalate.

It has been observed that crystals of dimethylterephthalate formed in paraxylene are of high density and are very difficult to keep in suspension. Hence, this results in immense handling problems. For example, with less than four weight parts of paraxylene, pump around heat exchangers are almost unusable unless very high velocities and gradual bends in the system are used. Methanol alone is not desirable since large quantities are needed to dissolve the dimethylterephthalate. However, a mixture of the two solvents used in amounts of from about 1 to about 5 weight parts, preferably from about 2 to about 4 weight parts, is quite desirable. For example, 3.0–3.6 weight parts of the mixed solvent are adequate from the solvent standpoint, the crystals remain in suspension, and cooling by auto-refrigeration and/or pump-around heat exchange is easily accomplished; and filtration is improved. The present invention also allows dimethylterephthalate of improved high temperature color stability to be obtained. Thus, the advantages of the invention include: improved solubility, improved crystal handling and improved filtration rates and high temperature color stability.

In accordance with the present invention, it has been found that a solution containing about 2% to about 50% by wt. of methanol based on paraxylene is superior to either paraxylene or methanol. Thus, a xylene solvent containing methanol within this range gives a much better suspension of crystals of dimethylterephthalate in solvent phase than crystals of dimethylterephthalate in pure xylene. Using a methanol and xylene solution for recovery of purified dimethylterephthalate results in improved properties and advantages as set out above in the recovery of dimethylterephthalate over either xylene or methanol alone.

The present invention will be further illustrated by reference to the drawing in which the single figure is a flow diagram representing a best mode contemplated for carrying out the invention.

Referring now to the drawing, numeral 10 designates a reaction zone into which there is introduced by way of line 11 controlled by valve 12, paraxylene into line 13. Connecting to line 13 is line 14 controlled by valve 15 by way of which methanol is introduced into the system. Line 13 feeds into an incorporator or mixing device 16 which in turn discharges into line 17 containing a preheater 18 by way of which the mixture of xylene and methanol is heated to reaction temperature. Reaction temperature may range from about 300° F. to about 600° F. and a pressure of about 300 to about 1000 p.s.i.g. may be maintained on reaction zone 10. The methanol comprises about 2% to about 50% of the liquid phase 19 in zone 10 and at least about 3 moles of methanol per mole of xylene are introduced thereto. Optionally, an oxidation catalyst may be introduced into line 13 from a source (not shown) by opening valve 20. This oxidation-esterification catalyst may suitably be a cobalt or manganese salt, such as the naphthenates, acetates, bromides, chlorides and the like. However, the use of an oxidation catalyst is optional.

Reaction zone 10 is a stirred reaction zone and agitation is provided by mixing device 21 powered through shaft 22 by prime mover 23 which suitably may be an electric motor. An oxidant, such as a gasiform medium which may be air or pure oxygen, is introduced into zone 10 by way of line 24. When the oxidation-esterification reaction takes place in reaction zone 10 to form light and heavy oxidized products, the light product may be removed from zone 10 by line 24 for recovery of the light oxidized products which may be recycled to zone 10. Water formed in the reaction would be discharged also through line 11.

The liquid reaction zone products are discharged by line 25 into a suitable flash drum 26 and light products may be removed therefrom by line 27 for treatment and recovery of the flashed products including unreacted xylene and methanol. The heavier products containing the dimethylterephthalate and impurities are discharged from drum 26 by line 28 and may be introduced thereby, by opening valve 29, into a distillation zone 30 wherein the xylene-methanol ratio may suitably be adjusted by distillation. Thus, with paraxylene and methanol continuously introduced by lines 11 and 14, the ratio may be adjusted in zone 30 with methanol and/or xylenes being removed by line 31. The impure dimethylterephthalate may be dissolved in the mixed solvent at a temperature within the range of 200° F. to 300° F. although higher temperatures may be used.

If paraxylene and methanol are not continuously introduced, or if the ratio of xylene and methanol in the product discharged by line 28 is not within the range given, the distillation zone 30 may be bypassed by closing valve 29 and allowing flow by line 32 controlled by valve 33 into line 34 and thence by way of lines 35 and 36 into crystallization zone 37. When distillation zone 30 is bypassed, paraxylene may be added to line 34 by opening valve 38 and methanol may be added to line 36 by opening valve 39. By these means, the amount of methanol in the paraxylene solution is suitably adjusted to maintain it within the range from about 2% to about 50% by weight based on the xylene.

The solution of dimethylterephthalate containing impurities discharges by line 36 into crystallization zone 37 which is suitably equipped with a stirring device 38. Crystallization zone 37 is also provided with a cooling means illustrated by coil 41 through which a suitable refrigerant may be circulated. In crystallization zone 37, the temperature of the solution is reduced to cause crystallization of dimethylterephthalate from the methanol-xylene solution. The solution may be suitably cooled to a temperature within the range from about 80° F. to about 140° F. By employing a methanol-xylene solution containing 2% to about 50% by wt. of methanol, readily handled and filterable crystals are formed and the solution containing these crystals is withdrawn by line 42 containing pump 43 and pumped into a separation zone 44 which suitably may be a centrifugation, decantation or filtration zone or a combination of centrifugation, decantation or filtration zones. In any event, regardless of the type of separation means employed, dimethylterephthalate is separated from the solvent in zone 44 and recovered as purified crystals by way of line 45. The solvent mixture is discharged by line 46 and may be reused in the process either as a feed to reaction zone 10 or to adjust the ratio of the methanol-xylene solvent.

It will be readily seen by reference to the drawing that a simple purification process has been devised for removing impurities from dimethylterephthalate which remain in the solvent. In order to illustrate the invention further, reference is made to the following examples.

EXAMPLE 1

Approximately 1200 pounds of a mixture of three parts of paraxylene and one part of dimethylterephthalate (DMT) were transferred to a batch vacuum crystallizer at 200° F. to 250° F. and then subsequently cooled to approximately 120° F. After several attempts, the liquid slurry in the vessel was pumped to a centrifuge where a part of the solid DMT was recovered. The major part of the DMT entering the crystallizer was solidified in the crystallizer and could not be removed in the pump slurry.

After cleaning the crystallizer with hot xylene, an additional 1200 pounds of the same paraxylene-DMT mixture was introduced into the crystallizer along with approximately 250 pounds of methanol. The resulting mixture was easily cooled to crystallization temperature of 120° F. and was easily pumped and centrifuged. Essentially all of the DMT charged to the crystallizer was recovered. On stripping the recovered DMT by distillation, a product of good quality was obtained.

EXAMPLE 2

A charge of 3812 parts of crude DMT was distilled in a 10-plate column at atmospheric pressure and at a 5:1 reflux ratio. A total of eleven cuts were made, then a 6.48 to 96.78 weight percent heart cut fraction was blended for further purification. Several crystallizations were made on the hydrocarbon fraction in comparing the present invention using a mixture of paraxylene and methanol in one instance and paraxylene alone and methanol alone in other instances. The results of these runs are shown in the following table.

TABLE I

| Sample No. | 1 | 2 | 3 |
|---|---|---|---|
| Crystallization: | | | |
| Crystallization solvent | Paraxylene | Paraxylene + Methanol | Methanol |
| Solvent/DMT ratio | 3/1 | 4/1 | 15/1 |
| Filter wash solvent | Paraxylene | Methanol | Methanol |
| Wash solvent/DMT | 1/1 | 1/1 | 1/1 |
| Solvent removed by | Vacuum | N₂ purge | N₂ purge |
| DMT properties: | | | |
| Acidity, meq./kg | 2.3 | 0.4 | |
| Hazen color at 410° F.: | | | |
| 0 hrs | 15 | 15 | 10 |
| 100 hrs | 270 | 65 | 205 |
| 200 hrs | 300 | 110 | 405 |

From the foregoing data in which paraxylene and methanol were present in the percentage of 75% paraxylene and 25% methanol by weight, it will be seen that use of a mixed solvent in a single crystallization allows the obtaining of DMT of improved high temperature color stability over that obtainable by the use of paraxylene or methanol alone. Also, not shown by the data but reflected by observation, the crystallization employing the mixed solvent allowed the obtaining of improved results in crystal handling, recovery and solubility in the mixed solvent.

The nature and objects of the present invention having been completely described and illustrated and the best mode and embodiment contemplated set forth, what we wish to claim as new and useful and secure by Letters Patent is:

1. In the purification of dimethylterephthalate, produced in the one-step oxidation-esterification of paraxylene in the presence of methanol, in which impure dimethylterephthalate is dissolved in paraxylene to form a solution and purified dimethylterephthalate recovered from said solution by crystallization, the improvement which comprises:

maintaining in said solution containing dimethylterephthalate an amount of methanol within the range from about 2% to about 50% by weight based on the paraxylene;

crystallizing dimethylterephthalate from said methanol-xylene solution; and recovering said crystallized dimethylterephthalate from said methanol-xylene solution.

2. A method in accordance with claim 1 in which the amount of methanol is from about 20% to about 33% by weight of said paraxylene.

3. A method in accordance with claim 1 in which the dimethylterephthalate is recovered by filtration of said methanol-xylene solution.

4. A method in accordance with claim 1 in which the dimethylterephthalate is recovered by decantation of said methanol-xylene solution.

5. A method in accordance with claim 1 in which the dimethylterephthalate is recovered by centrifugation of said methanol-xylene solution.

6. A method in accordance with claim 1 in which the methanol and xylene content of the dimethylterephthalate solution is maintained by distillation to remove at least a portion of at least one of said solvents.

7. A method in accordance with claim 1 in which the methanol and xylene content of the dimethylterephthalate solution is maintained by adding to said solution a sufficient amount of at least one of said solvents.

8. A method in accordance with claim 1 in which the dimethylterephthalate is crystallized from said methanol-xylene solution by cooling the solution to a temperature within the range from about 80° F. to about 140° F.

9. A method in accordance with claim 1 in which the impure dimethylterephthalate is dissolved at a temperature within the range from about 200° F. to about 300° F.

References Cited

FOREIGN PATENTS 828,919    2/1960    Great Britain.

JAMES A. PATTEN, Primary Examiner

E. JANE SKELLY, Assistant Examiner